United States Patent Office 3,202,479
Patented Aug. 24, 1965

3,202,479
SEPARATION OF RUTHENIUM FROM
AQUEOUS SOLUTIONS
Joseph J. Katz, Chicago, Ill., assignor to the United States of America as represented by the United States Atomic Energy Commission
No Drawing. Filed Aug. 8, 1950, Ser. No. 178,355
12 Claims. (Cl. 23—140)

This invention deals with the separation of ruthenium values from aqueous solutions and in particular with the volatilization of ruthenium values from aqueous acid solutions in the form of ruthenium tetroxide.

It is an object of this invention to provide a process for eliminating ruthenium values from aqueous solutions which does not necessitate adding of a substantial amount of foreign ions so that no undesirable reaction products are formed in the solution by the reaction.

This and other objects are accomplished by treating the ruthenium-containing aqueous solution, in the presence of an oxidation catalyst, with ozone whereby the ruthenium is oxidized to ruthenium tetroxide and volatilized as such.

A great number of catalysts have been found suitable for the process of this invention. For instance, substances containing permanganate anions, dichromate anions, silver cations, cerium (IV) cations, cobalt cations, nickel cations, periodate anions, bromate anions and lead dioxide have given very good results. Molarities of these catalysts ranging from 0.001 to 0.1 have been used with satisfaction.

While heating of the solution from which the ruthenium is to be removed is not necessary and, in fact, mostly does not show any advantage over treatment at room temperature, an elevated temperature up to 90°–100° C. has been found preferable in the case that uranium and/or plutonium values are present in the solution.

The ozone is preferably introduced in diluted form, for instance in admixture with oxygen, air, nitrogen or the like. Concentrations of from 0.5 to 5% of ozone in the gas mixture have been found suitable.

It is advisable to carry out the process of this invention in acid solution as has been mentioned above. Mineral acids, such as sulfuric acid, hydrochloric acid, and nitric acid, are suitable. Studies made on the concentration of the acid showed that the results of the process are not impaired by changes of the molarity.

The process of this invention is particularly advantageous in the solvent extraction process for the separation of uranium and plutonium from fission products. In this process ruthenium, which is a fission product, has always been a complicating factor because it is extracted together with uranium and with plutonium and difficult to separate therefrom. This fact made it necessary for complete separation to apply a great number of solvent extraction cycles. This disadvantage is overcome by the process of this invention, since practically the entire amount of the ruthenium may be removed prior to solvent extraction. Another instance where this process has utility is in the precipitation of plutonium with a carrier precipitate from aqueous solutions. Also there it is useful to remove the ruthenium prior to precipitation.

The process of this invention is useful in the removal and recovery of ruthenium values from aqueous solutions obtained by the leaching of ruthenium-containing ores.

In the following table, a number of experiments are compiled which show the operativeness of the process and in particular the criticalness of the use of a catalyst.

Table I

| Flow rate of $O_2$ containing 1% ozone, cc./min. | $HNO_3$ concentration, N | Catalyst | | Ruthenium content | Time of ozonization, hrs. | Ruthenium volatilized, percent |
|---|---|---|---|---|---|---|
| | | Type | Conc., M | | | |
| 60 | 5 | | | $3 \times 10^4$ cts./cc./min. | 6 | 8 |
| 60 | 5 | $Ag^+$ | 0.01 | do | 6 | 27 |
| 60 | 5 | $Ag^+$ | 0.01 | do | 30 | 60 |
| 1400 | 5 | $Ag^+$ | 0.025 | do | 2 | 94 |
| 1400 | 5 | $MnO_4^-$ | 0.001 | do | 2 | 99 |
| 1400 | 5 | Ce (IV) | 0.001 | do | 2 | 70 |
| 1400 | 0.3 | $Ag^+$ | 0.025 | 0.1 mg./l. plus $10_4$ cts./cc./min. | 1.5 | 99.7 |
| 1400 | 0.1 | $Ag^+$ | 0.025 | do | 2.5 | 99.7 |
| 1400 | 0.8 | $Ag^+$ | 0.025 | do | 2.5 | 99.1 |
| 1400 | 0.8 | $Ag^+$ | 0.025 | do | 8.7 | 99.7 |
| 840 | 0.1 | $Ag^+$ | 0.025 | do | 4 | 99.2 |
| 1400 | 0.1 | $Ag^+$ | 0.01 | do | 3.5 | 99.1 |
| 1400 | 0.3 | Ce (IV) | 0.025 | do | 1.5 | 99 |
| 1400 | 0.3 | $Ni^{++}$ | 0.025 | do | 8 | 80 |
| 1400 | 0.1 | Pu (IV) | 0.001 | do | 5 | 59 |

All runs illustrated in this table were carried out at room temperature. It will be seen from this table that in the first experiment, where no catalyst was used, only 8% of ruthenium had been volatilized as ruthenium tetroxide after an ozonization time of six hours, while in the second experiment, which was carried out under identical conditions except for the presence of silver ions at a concentration of 0.01 M, 27% of the ruthenium was removed.

The application of the process of this invention to the removal of ruthenium from solvent extraction feed solutions and from dissolver solutions obtained by dissolving neutron-irradiated uranium slugs, in other words, to solutions containing uranyl nitrate or other uranium salts and plutonium salts, is illustrated in Table II. A few preliminary tests which, for the sake of comparison, were carried out with a uranium- and plutonium-free ruthenium solution, are also included in this table.

Table II

| Conc. of uranium, M | Type of ruthenium | Conc. of nitric acid, N | Conc. of $O_3$ in $O_2$, percent by wt. | Flow rate of gas, cc./min. | Catalyst Type | Catalyst Conc., M | Time of ozonization, hrs. | Temperature, °C. | Ruthenium volatilized, percent |
|---|---|---|---|---|---|---|---|---|---|
| | Tracer | 0.3 | 5 | 300 | $Na_2Cr_2O_7$ | 0.025 | 2 | 25 | 92 |
| | do | 0.3 | 5 | 300 | $Na_2Cr_2O_7$ | 0.025 | 5 | 25 | 96 |
| | do | 0.3 | 5 | 300 | $H_5IO_6$ | 0.025 | 2 | 25 | 95 |
| | do | 0.3 | 0.5 | 3100 | $AgNO_3$ | 0.025 | 2 | 25 | 99.8 |
| | do | 0.3 | 0.5 | 3100 | Ce (IV) | 0.025 | 1 | 25 | 95 |
| | do | 0.3 | 1 | 1400 | $AgNO_3$ | 0.025 | 2 | 25 | 99.7 |
| | do | 0.3 | 0.5 | 1400 | Ce (IV) | 0.025 | 2 | 25 | 99 |
| 2 | Dissolver solution conc. | 0.3 | 0.5 | 3100 | Ce (IV) | 0.025 | 2 | 95 | 84 |
| 2 | do | 0.3 | 0.5 | 3100 | Ce (IV) | 0.025 | 12 | 95 | 93 |
| 2 | do | 0.3 | 0.5 | 3100 | $KMnO_4$ | 0.001 | 5 | 95 | 96 |
| 2 | do | 0.3 | 0.5 | 3100 | $KMnO_4$ | 0.001 | 12 | 95 | 97 |
| 2 | do | 0.3 | 5 | 3000 | $AgNO_3$ | 0.025 | 12 | 95 | 98 |
| 2 | do | 0.3 | 5 | 3000 | $AgNO_3$ | 0.025 | 20 | 95 | 99 |
| 2 | do | 0.3 | 5 | 1500 | $KMnO_4$ | 0.001 | 12 | 100 | 98 |
| 2 | do | 0.3 | 5 | 3000 | $KBrO_3$ | 0.1 | 8 | 100 | 98 |
| 2 | 0.1 mg./cc. plus tracer. | 2 | 1 | 1400 | None | | 2.5 | 50 | 55 |
| 1 | do | 0.3 | 1 | 1400 | $Ag^+$ | 0.025 | 6 | 25 | 94 |
| 2 | Tracer | 0.3 | 1 | 560 | $Ag^+$ | 0.01 | 10 | 75 | 96 |
| 0.1 | do | 0.3 | 1 | 1400 | $Ag^+$ | 0.01 | 2.5 | 25 | 99.4 |
| 2.0 | do | 0.3 | 1 | 1400 | $Ag^+$ | 0.025 | 13 | 90 | 99.9 |
| 2.0 | do | 0.3 | 1 | 1400 | Ce (IV) | 0.025 | 13 | 85 | 99.1 |
| 2.0 | Dissolver solution conc. | 0.1 | 1 | 840 | $Ag^+$ | 0.025 | 4 | 50 | 77 |
| 2.0 | do | 0.3 | 1 | 840 | $Ag^+$ | 0.025 | 4 | 50 | 75 |
| 2.0 | do | 0.3 | 1 | 1400 | $Ag^+$ | 0.025 | 13 | 90 | 98 |
| 2.0 | do | 0.3 | 1 | 1400 | $Ag^+$ | 0.025 | 15 | 95 | 91 |
| *2.0 | do | 0.3 | 1 | 1400 | $Ag^+$ | 0.025 | 10 | 90 | 23 |

* Ozonator walls were cooled which reduced distillation of $RuO_4$.

The uranyl nitrate concentration, as obvious from the table, ranged from 0 to 2 M. The ruthenium removal from the solutions containing uranium was considerably slower than from the uranium-free aqueous solutions; however, a fairly complete removal may also be obtained in the presence of uranium as is obvious from the experiments which yielded a ruthenium volatilization of 99% and more.

While there have been described herein certain specific embodiments of the invention, limitation to the details given is not intended, and modifications may be made within the spirit of the disclosure and the scope of the appended claims.

What is claimed is:

1. A process for separating ruthenium values from aqueous acid solutions, which comprises adding an oxidation catalyst to said solutions and introducing ozone in a concentration of at least 0.5% by weight thereinto whereby ruthenium tetroxide is formed and volatilized.

2. The process of claim 1 wherein the maximum temperature at which the process is carried out is 90° C.

3. The process of claim 2 wherein a diluent gas is used for carrying the ozone.

4. A process for separating ruthenium values from acidic aqueous solutions, which comprises adding an oxidation catalyst to said solutions to provide a concentration of 0.001 to 0.1 M and introducing a mixture of at least 0.5% by weight of ozone and a diluent gas thereinto whereby ruthenium tetroxide is formed and volatilized.

5. The process of claim 4 wherein the diluent gas is oxygen.

6. The process of claim 4 wherein the diluent gas is nitrogen.

7. The process of claim 4 wherein the diluent gas is air.

8. The process of claim 4 wherein the oxidation catalyst is permanganate anion.

9. The process of claim 4 wherein the oxidation catalyst is silver cation.

10. The process of claim 4 wherein the oxidation catalyst is cerium (IV) cation.

11. The process of claim 4 wherein the oxidation catalyst is dichromate anion.

12. The process of claim 4 wherein the mixture of ozone and a diluent gas is introduced into the solution while at room temperature.

References Cited by the Examiner

Hayhurst et al.: Journal of the Chemical Society, vol. 97, pp. 868–877 (1910).

Ruff et al.: Zeitschrift für anorganische Chemie, vol. 136, pp. 49–61 (1924).

MAURICE A. BRINDISI, *Primary Examiner.*

JAMES L. BREWRINK, *Examiner.*